United States Patent
Sinha et al.

(10) Patent No.: US 9,612,663 B2
(45) Date of Patent: Apr. 4, 2017

(54) MULTIMODAL SYSTEM AND METHOD FACILITATING GESTURE CREATION THROUGH SCALAR AND VECTOR DATA

(71) Applicant: Tata Consultancy Services Limited, Mumbai (IN)

(72) Inventors: Aniruddha Sinha, Kolkata (IN); Kingshuk Chakravarty, Kolkata (IN); Rohit Kumar Gupta, Kolkata (IN); Arpan Pal, Kolkata (IN); Anupam Basu, Kolkata (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 14/387,007

(22) PCT Filed: Mar. 8, 2013

(86) PCT No.: PCT/IN2013/000139
§ 371 (c)(1),
(2) Date: Sep. 22, 2014

(87) PCT Pub. No.: WO2013/175484
PCT Pub. Date: Nov. 28, 2013

(65) Prior Publication Data
US 2015/0049016 A1    Feb. 19, 2015

(30) Foreign Application Priority Data
Mar. 26, 2012   (IN) ............................ 805/MUM/2012

(51) Int. Cl.
*G09G 5/00*    (2006.01)
*G06F 3/01*    (2006.01)
(Continued)

(52) U.S. Cl.
CPC ............ *G06F 3/017* (2013.01); *A63F 13/213* (2014.09); *A63F 13/215* (2014.09); *G06F 3/011* (2013.01);
(Continued)

(58) Field of Classification Search
CPC . G06F 3/01; G06F 3/011; G06F 3/017; G06F 3/0425; G06F 3/0426;
(Continued)

(56) References Cited

U.S. PATENT DOCUMENTS 4,988,981 A * 1/1991 Zimmerman ......... A61B 5/1114
345/156
5,686,957 A    11/1997 Baker
(Continued)

OTHER PUBLICATIONS

Maria Karam and M.C. Schraefel, "A taxonomy of Gestures in Human Computer Interaction", University of Southampton, Aug. 25, 2005 (45 pages).
(Continued)

*Primary Examiner* — Joe H Cheng
(74) *Attorney, Agent, or Firm* — Finnegan, Henderson, Farabow, Garrett & Dunner, L.L.P.

(57) ABSTRACT

A device and a method facilitating generation of one or more intuitive gesture sets for the interpretation of a specific purpose are disclosed. Data is captured in a scalar and a vector form which is further fused and stored. The intuitive gesture sets generated after the fusion are further used by one or more components/devices/modules for one or more specific purpose. Also incorporated is a system for playing a game. The system receives one or more actions in a scalar and a vector from one or more user in order to map the action with at least one pre stored gesture to identify a user in control amongst a plurality of users and interpret the action of user for playing the game. In accordance with the
(Continued)

interpretation, an act is generated by the one or more component of the system for playing the game.

11 Claims, 7 Drawing Sheets

(51) Int. Cl.
    *A63F 13/213*     (2014.01)
    *A63F 13/215*     (2014.01)
    *G06K 9/00*     (2006.01)
    *G06K 9/62*     (2006.01)

(52) U.S. Cl.
    CPC ......... *G06K 9/00335* (2013.01); *G06K 9/629* (2013.01); *G06K 9/6293* (2013.01)

(58) Field of Classification Search
    CPC .......... G06F 2203/04808; A63F 13/215; A63F 13/424; A63F 13/428; G09K 9/00335
    See application file for complete search history.

(56) References Cited

U.S. PATENT DOCUMENTS

| | | | |
|---|---|---|---|
| 6,009,396 A | 12/1999 | Nagata | |
| 6,111,580 A | 8/2000 | Kazama et al. | |
| 6,243,683 B1 | 6/2001 | Peters | |
| 6,853,880 B2 | 2/2005 | Sakagami et al. | |
| 7,181,393 B2 | 2/2007 | Lu et al. | |
| 7,321,854 B2 | 1/2008 | Sharma et al. | |
| 7,725,547 B2 * | 5/2010 | Albertson | G06F 3/016 382/107 |
| 8,098,843 B2 | 1/2012 | Kawaguchi et al. | |
| 8,558,759 B1 * | 10/2013 | Prada Gomez | G06F 3/017 345/156 |
| 8,669,938 B2 * | 3/2014 | Richardson | G06F 3/012 345/158 |
| 9,069,164 B2 * | 6/2015 | Starner | G02B 27/017 |
| 9,229,231 B2 * | 1/2016 | Small | G06F 3/013 |
| 2004/0056907 A1 | 3/2004 | Sharma et al. | |
| 2005/0264527 A1 * | 12/2005 | Lin | G06F 3/011 345/156 |
| 2006/0238490 A1 * | 10/2006 | Stanley | G06F 3/017 345/156 |
| 2008/0192005 A1 * | 8/2008 | Elgoyhen | G06F 3/014 345/158 |
| 2009/0085864 A1 * | 4/2009 | Kutliroff | A63F 13/10 345/156 |
| 2010/0031203 A1 | 2/2010 | Morris et al. | |
| 2010/0199232 A1 | 8/2010 | Mistry et al. | |
| 2010/0208038 A1 * | 8/2010 | Kutliroff | G06K 9/00201 348/46 |
| 2010/0225461 A1 | 9/2010 | Tuli | |
| 2011/0115702 A1 * | 5/2011 | Seaberg | G06F 3/017 345/156 |
| 2012/0078614 A1 * | 3/2012 | Galor | G06F 3/011 704/9 |
| 2012/0313847 A1 * | 12/2012 | Boda | H04M 1/72569 345/156 |
| 2013/0124209 A1 * | 5/2013 | Yamada | G06K 9/00335 704/275 |
| 2013/0265226 A1 * | 10/2013 | Park | G06F 3/017 345/156 |

OTHER PUBLICATIONS

International Search Report mailed on Jan. 14, 2014 in International Application No. PCT/IN2013/000139 (2 pages).

* cited by examiner

MULTIMODAL SYSTEM AND METHOD FACILITATING GESTURE CREATION THROUGH SCALAR AND VECTOR DATA

CROSS-REFERENCE TO RELATED PATENT APPLICATIONS

This application is a National Stage Entry under 35 U.S.C. §371 of International Application No. PCT/IN2013/000139, filed Mar. 8, 2013, which claims priority from Indian Patent Application No. 805/MUM/2012, filed Mar. 26, 2012. The entire contents of the above-referenced applications are expressly incorporated herein by reference for all purposes.

BACKGROUND OF THE INVENTION

The basic objective of Human Computer Interaction (HCI) is to improve the interaction between users and computers by making computers more usable and receptive to user's needs. Furthermore, HCI seeks to design a system which would decrease the hurdles between the human's action instructing a specific task to be accomplished and the computer understands of the same. HCI, using visual information as an input, has wide applications ranging from computer games to control of robots. The main advantage of using visual information as an input is that it makes communication with the computer possible from a distance without the need of any physical contact. Visual information comprising of movement due to skeleton points is chiefly beneficial when the environment surrounding the user is noisy, where speech commands would prove to be less cognizable. On the other hand, speech commands are beneficial when the user is visually impaired or is incapable of offering hand gestures as an input to the computer.

At present lot of system and methods are available for enabling the interaction of user with that of compute or machine. Most of them use either visual gesture for controlling or interacting with the machine or uses direction of sound by which user is detected. Although all these methods have made the HCI easier but there are numerous challenges with these current Human Computer Interaction methodologies. The individual mode of interaction using either visual or just speech input is less accurate. The existing vocabulary or dictionary for visual, sound and speech gestures is inadequate. In addition, as the number of gestures increases, the recognizing capability of the gestures by the classifier is reduced. Also, in the case of skeleton based tracking of human postures for detection of gestures, there is a difficulty in tracking the skeleton points when they come close to each other. Moreover, when there are multiple users, the computer may erroneously register a controlling user. Thus, the recognition accuracy of a controlling user reduces in the case of a multi-user system. Also, no work has been done for combining or fusing the directionality of sound or speech simultaneously with visual or touch gestures to create a multimodal gesture command.

Thus, there is a need for creating an intuitive gesture set combining the directionality of sound or speech simultaneously with visual or touch gestures to achieve accuracy in the interaction between humans and computers and to provide a solution of recognizing user in control amongst one or more users.

SUMMARY OF THE INVENTION

The present invention provides a device that facilitates generation of one or more intuitive gesture sets to be interpreted further for a specific purpose. The device comprises of a gesture creator including one or more sensors adapted to sense data in a scalar and a vector form from at least one user. The gesture creator further comprises of a fusing module configured to process the data to fuse the vector and the scalar form of data for generating one or more intuitive gesture sets and a non-transitory tangible media adapted to store the generated intuitive gesture sets in order to create a gesture library to be used for further interpretation by a reciprocating module. The device facilitates generation of the intuitive gesture sets such that the reciprocating module further uses the gesture library for mapping a similar gesture set with the gesture set stored in the non-transitory tangible media for further interpretation for the specific purpose.

The present invention also provides a computer implemented method that facilitates generation of one or more intuitive gesture sets to be interpreted further for a specific purpose. The method comprising steps of sensing data in a scalar and a vector form from at least one user, processing the sensed data in order to fuse the scalar and vector form of the data to generate one or more intuitive gestures sets and storing the generated intuitive gesture sets in order to create a gesture library to be used for further interpretation. The method facilitates the generation of the intuitive gesture sets such that the further interpretation is performed by using the stored intuitive gesture sets for mapping with a similar gesture set to interpret them for a specific purpose.

The present invention further provides a system for playing a game. The system comprises of a user interface configured to receive one or more actions in a scalar and a vector form from one or more users playing the game, a processor configured to identify a correlation among each of the scalar and vector data with respect to spatial and temporal correspondence to identify a user in control amongst the one or more users. The processor further comprises of a gesture library configured to map the correlated scalar and vector form of data with at least one pre stored intuitive gesture sets to identify a distinct interpretation for the action of user in control and a reciprocating module configured to generate an act in response to the distinct interpretation for the user in control based upon the mapping for playing the game.

OBJECTS OF THE INVENTION

It is the prime object of the invention to provide a system and method for generating intuitive gesture set.

It is another object of the invention to provide a system and method for generating the intuitive gesture set to be interpreted further for a specific purpose.

It is another object of the invention to provide a system and method for sensing data in scalar and vector form from one or more user.

It is another object of the invention to provide a system for playing a game.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this invention, illustrating its features, will now be discussed:

The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present invention, the preferred, systems and parts are now described. In the following description for the purpose of explanation and understanding reference has been made to numerous embodiments for which the intent is not to limit the scope of the invention.

One or more components of the invention are described as module for the understanding of the specification. For example, a module may include self-contained component in a hardware circuit comprising of logical gate, semiconductor device, integrated circuits or any other discrete component. The module may also be a part of any software programme executed by any hardware entity for example processor. The implementation of module as a software programme may include a set of logical instructions to be executed by the processor or any other hardware entity. Further a module may be incorporated with the set of instructions or a programme by means of an interface.

The disclosed embodiments are merely exemplary of the invention, which may be embodied in various forms.

The present invention relates to a device and a method for facilitating generation of one or more intuitive gesture sets. The device and method generates one or more intuitive gesture sets which are further interpreted for a specific purpose. Data is captured in a scalar and a vector form which is further fused and stored. The intuitive gesture sets generated after the fusion are further used by one or more components/devices/modules for one or more specific purpose.

Figure 1:
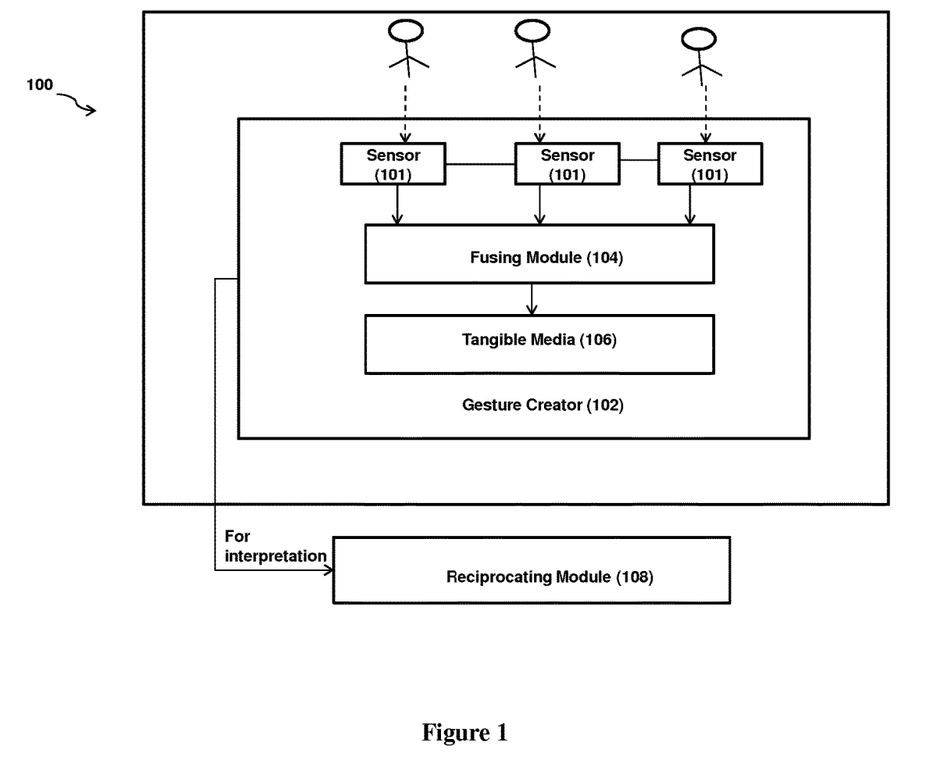
FIG. 1 illustrates a device for intuitive gesture creation according to an embodiment of the present subject matter.

In accordance with an embodiment, referring to FIG. 1, the device (100) comprises of a gesture creator (102) for creating one or more intuitive gestures. The gesture creator (102) further comprises of a fusing module (104) and a non-transitory tangible media (106) for storing the intuitive gestures thus created. These intuitive gestures are further interpreted for one or more specific purpose.

Figure 6:
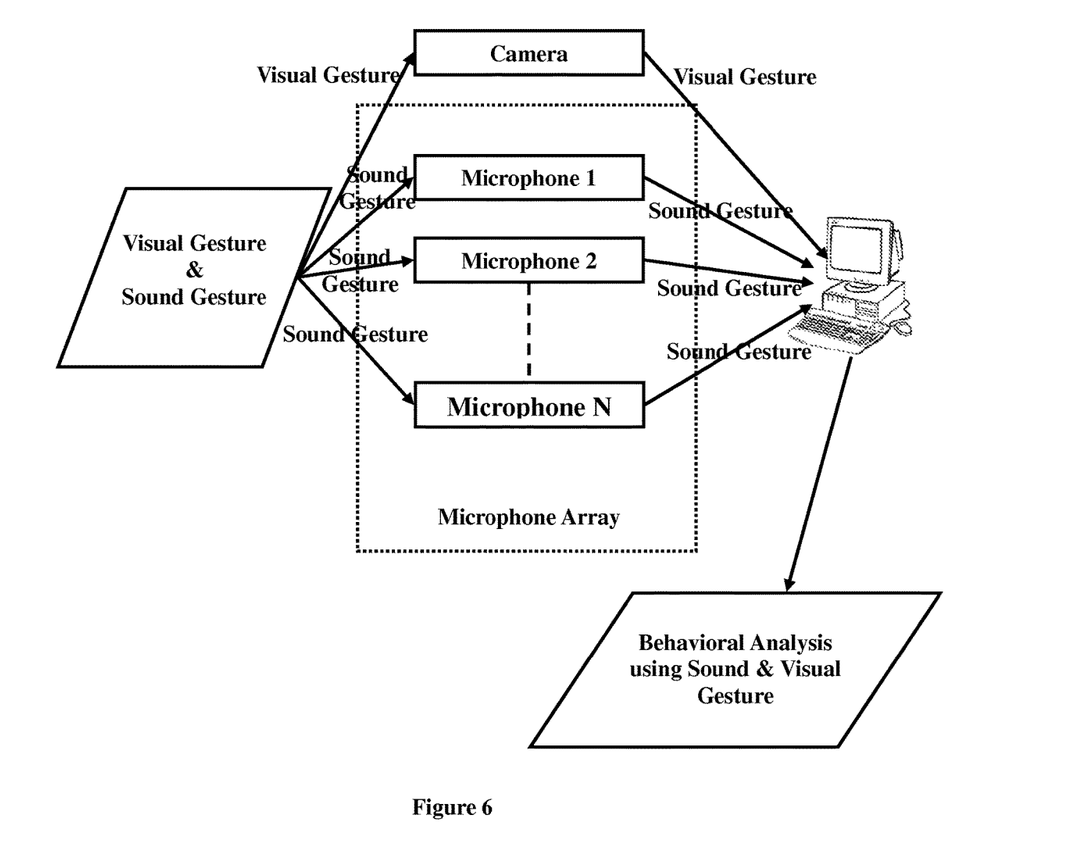
FIG. 6 illustrates an architecture of intuitive gesture creation according to an embodiment of the present invention.

Referring to FIG. 6, the gesture creator (102) includes one or more sensors (101) adapted to sense data in a plurality of form. The sensors (101) may include but is not limited to one or more microphone or one or more camera. The gesture creator (102) captures data from one or more user. The user should be in the range of microphone and the camera. The sensors (101) including camera and microphone senses data in a scalar form and a vector form. The camera and the microphone capture data in the scalar and the vector form.

Figure 3:
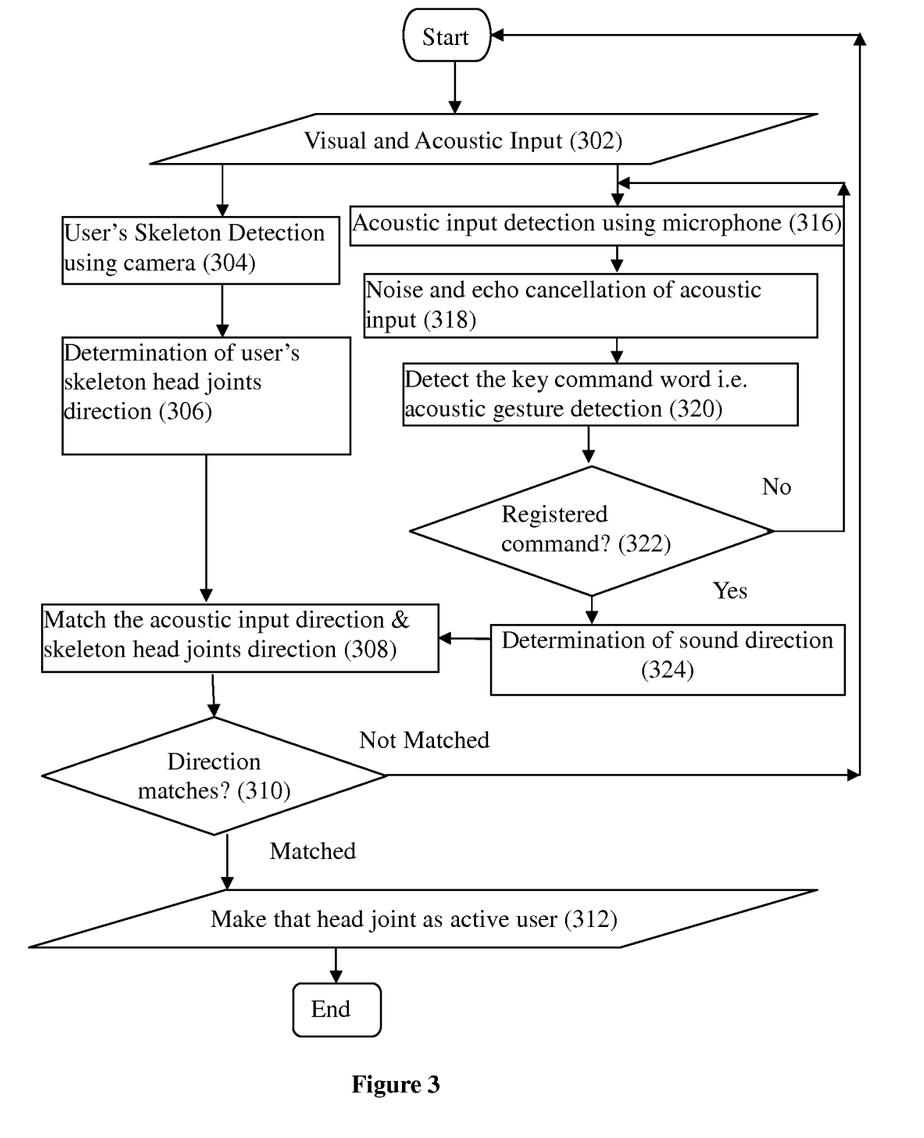
FIG. 3 illustrates a method for intuitive gesture creation according to an embodiment of the present subject matter.

The scalar form of data may include data in visual form or data in acoustic form and the data in vector form include direction of the acoustic form of data and the X,Y,Z cloud points of the visual data (as shown in step 302 of FIG. 3). The data in visual form includes but is not limited to gesture created due to relative motion between skeleton points like pointing left, clapping and moving hand for detecting the user (as shown in step 304 of FIG. 3). The data in acoustic form includes but is not limited to gesture created due to normal speech and sound or audio that human being or any source can generate easily, similar to whistling, clapping, and ringtone.

As illustrated in FIG. 6, the visual and sound gestures are captured by the plurality of microphones and cameras and are further transmitted to a processor for behavior analyses of one or more users.

Figure 4A:
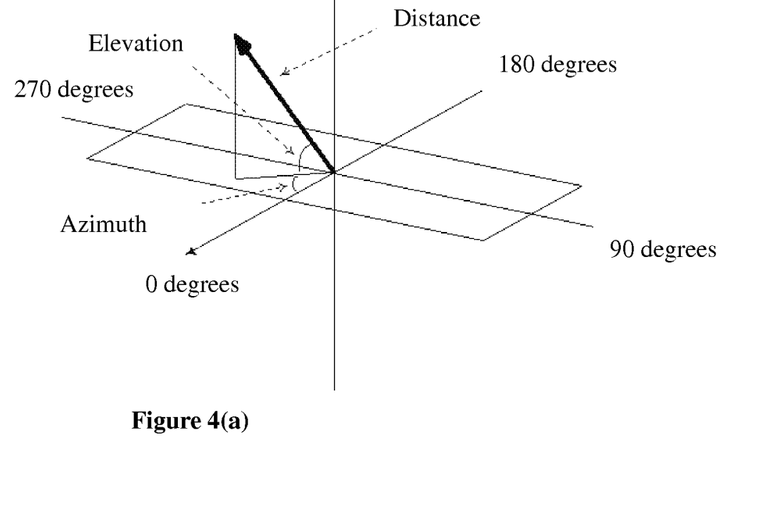
FIGS. 4(a) and 4(b) illustrate a method of getting the sound direction by calculating the azimuth angle and elevation angle according to an embodiment of the present subject matter.
Figure 4B:
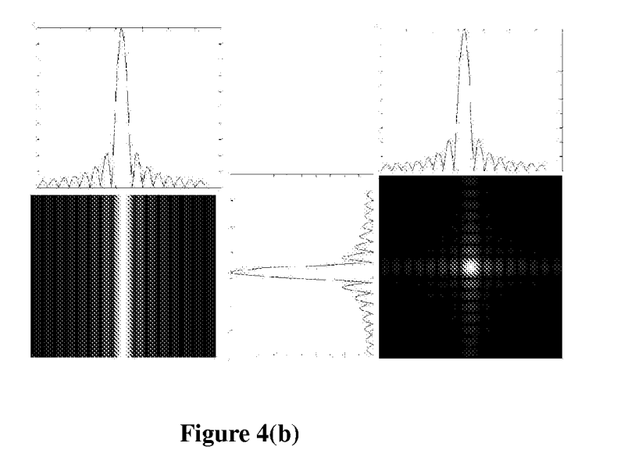

The data in the acoustic form captured by the microphone undergoes filtering through noise and echo-cancellation (as shown in step 318 of FIG. 3). FIG. 4 illustrates the technique of getting the sound direction by calculating the azimuth angle and elevation angle and thereby identifying the "active user" from the background. The active user is the user in control of the device. Referring to FIG. 4, the azimuth is the angle formed between reference directions (North) and a line from the microphone array to a point of interest projected on the same plane as the reference direction. The elevation is the angle between the horizontal plane and the reference beam joining the microphone array and the point of interest.

If the microphone array is arranged in a horizontal fashion then one dimensional function of sound power versus azimuth is obtained (as shown in FIG. 4a). If two orthogonal pairs of microphones are used then sound power along with elevation is obtained (as shown in FIG. 4b).

One dimensional (1D) sound image is registered with the camera image (both sharing the common center)
m=pixel column number
$f_{ov}$=camera field of view in radians
M=image width in pixels
Sound angle, $\theta_m$ is obtained by:

$$\theta_m = fov\left(\frac{m - \frac{M}{2}}{M}\right)$$

This sound angle is then used to calculate the corresponding interaural time delay, dm, as $$d_m = \frac{F_{samp} D_{mikes} \sin(\theta_m)}{V_{sound}}$$

Where $F_{samp}$ is the sampling frequency (44.1 KHz), $D_{mikes}$ is the spacing between the microphones, and $V_{sound}$ is the speed of the sound (344 m/s).

The fusing module (104) is configured to process the data to fuse the vector and the scalar form of data for generating one or more intuitive gesture sets. The scalar and vector form of data is fused in accordance with Bayesian rules.

A Bayesian multimodal fusion classifier is incorporated in the fusing module (104) to classify between the active user and "background" using skeleton and sound features described above. The decision rule for a two-class minimum Bayes risk classifier is expressed in terms of the probability density likelihood ratio as:

$$l(\bar{y}) = \frac{p_{y/w1}(\bar{y}/w_1)}{p_{y/w2}(\bar{y}/w_2)} \begin{matrix} w_1 \\ > \\ < \\ w_2 \end{matrix} \lambda_B$$

$$l(\bar{y}) = \frac{p_{y/w1}(\bar{y}/w_1)}{p_{y/w2}(\bar{y}/w_2)}$$

The terms $p_{y/w1}(\bar{y}/w_1)$ and $p_{y/w2}(\bar{y}/w_2)$ are the probability densities of the measurement vector $\bar{y}$ for classes w1 and w2, respectively.

Sound direction (x) and skeleton direction (s) are assumed to be statistically independent features, allowing their joint probability density to be expressed as the product of two independent densities. For two classes, "active user (A)" and "background (B)", these density functions can be written as:

$$p_{x,A}(x,s/A) = p_{x/A}(x/A) p_{s,A}(s/A)$$

$$p_{x,B}(x,s/B) = p_{x/B}(x/B) p_{s,B}(s/B)$$

Hence the likelihood ratio can be expressed as:

$$l(\bar{y}) = \frac{p_{x/A}(x/A) p_{s/A}(s/A)}{p_{x/B}(x/B) p_{s/B}(s/B)}$$

Where, the partial probability densities can be approximated by Gaussian distribution or uniform distribution as and when required depending on different situations.

Figure 2:
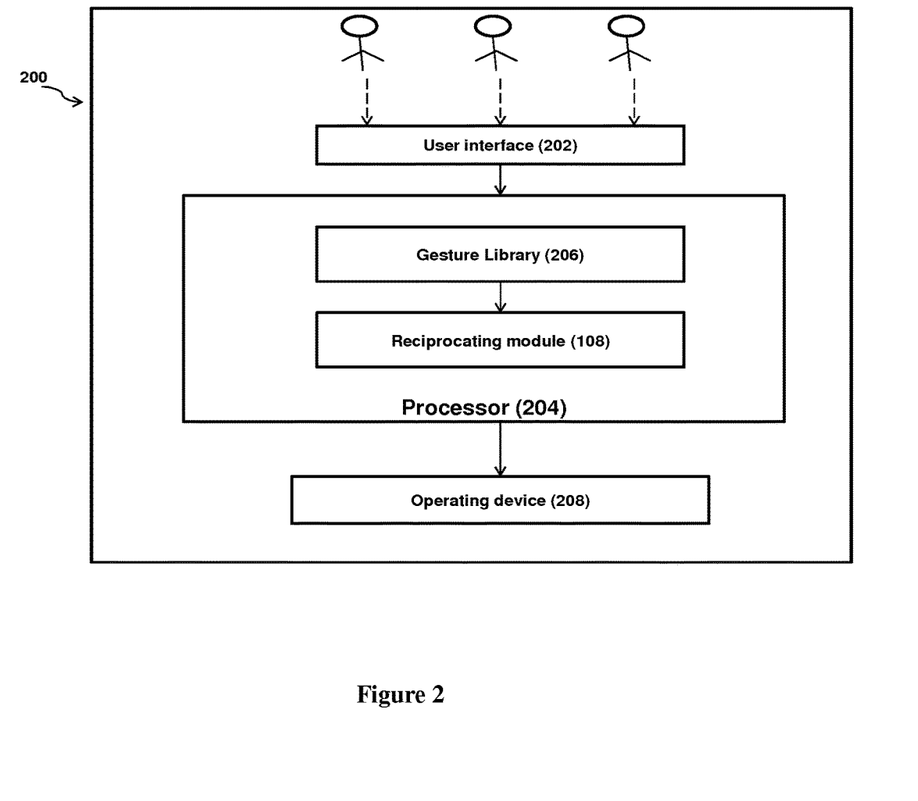
FIG. 2 illustrates a system for intuitive gesture creation according to an embodiment of the present subject matter.

The gesture creator (102) further comprises of a non-transitory tangible media (106) which is adapted to store the generated intuitive gesture sets in order to create a gesture library (206) (as shown in FIG. 2) to be used for further interpretation by a reciprocating module (108). The non-transitory tangible media (106) includes but is not limited to a storage device or a hard disk.

The reciprocating module (108) further uses the gesture library (206) for mapping a similar gesture set with the gesture set stored in the non-transitory tangible media (106) for further interpretation. This interpretation is carried out for specific purposes which includes but not limited to interpretation of gestures sets for playing a game, for controlling a vehicle, or for operating any electric device.

The present invention also relates to a system for playing a game. The system receives one or more actions in a scalar and a vector form from one or more user in order to map the action with at least one pre stored gesture to identify a user in control amongst a plurality of users and interpret his action for playing the game. In accordance with the interpretation, an act is generated by the one or more component of the system for playing the game.

In accordance with an embodiment, referring to FIG. 2, the system (200) comprises of a user interface (202) which is configured to receive one or more actions in a scalar and a vector form from one or more users playing the game. The scalar form of data includes data in visual or acoustic form or a combination thereof and vector form of data includes the direction of the acoustic form of data and the X,Y,Z cloud points of the visual data as described above.

The system further comprises of a processor (204), which is configured to identify a correlation among each of the scalar and vector data with respect to spatial and temporal correspondence to identify a user in control amongst the one or more users. The data in the acoustic form is detected using the microphone array (as shown in step 316 of FIG. 3). The processor (204) detects the key command word (gesture in the acoustic form) (as shown in step 320 of FIG. 3). The processor (204) identifies if the detected gesture in the acoustic form is a registered command gesture (as shown in step 322). Further, the data in the acoustic form captured by the microphone undergoes filtering through noise and echo-cancellation (as shown in step 318). The direction of the acoustic form of data is obtained by the azimuth and elevation method as described above.

In addition, the processor (204), detects the user's skeleton (data in the visual form) using the camera (as shown in step 306 of FIG. 3). The direction of the user's skeleton head joints is determined using the azimuth and elevation calculation as described above. The direction of the data in the acoustic form and the direction of the skeleton head joints are matched/fused (as shown in step 308 of FIG. 3) using the adapted Bayes algorithm which is described above. If the direction of the data in the acoustic form and direction of the skeleton head joint correlates with respect to spacial and temporal correspondence (as shown in step 310), then the head joint is recognized as the active user (as shown in step 312 of FIG. 3).

The processor (204) further comprises of a gesture library (206). The gesture library (206) is used for the storing the pre determined intuitive gesture sets (the creation of such intuitive gesture sets is described above). The gesture library (206) is configured to map the correlated scalar and vector form of data with at least one pre stored intuitive gesture set to identify a distinct interpretation for the action of the user in control.

The processor (204) further comprises of a reciprocating module (108), which is configured to generate an act in response to the distinct interpretation for the user in control based upon the mapping with intuitive gestures stored in the gesture library (108) for playing the game. The act in response further includes one or more actions for playing the game.

In accordance with a preferred embodiment, the system further comprises of an operating device (206) which is adapted to display the act in response to the distinct interpretation for the action of user in control. The operating device (206) includes but is not limited to a screen or a monitor.

By way of specific example, a hypothetical image of the user in control may get displayed on a display and will perform the same action as done by user. For example, if user in control (as identified from a direction of his voice) says clap and also performs action of clap by his hands then the hypothetical image will also perform clap in a similar manner.

BEST MODE/EXAMPLE FOR WORKING OF THE INVENTION

The device and method illustrated for facilitating the generation of one or more intuitive gesture sets to be interpreted further for a specific purpose may be illustrated by working examples stated in the following paragraph; the process is not restricted to the said examples only:

Example 1

Let us consider that a user is using a multi-touch enabled system. Here, multi-touch is used for 2D zooming. Multi-touch is an input in a visual form. The sound "Zoooooo . . . " can be used as an input in an acoustic form. By combining the input in a visual form (multi-touch) and the input in acoustic form (sound "Zoooooo . . . "), 3D Zoom (depth zoom) can be produced for any multi-touch enabled system. Thus, by combining a gesture in visual form with a gesture in acoustic form, an intuitive gesture set can be created.

Example 2

Figure 5:
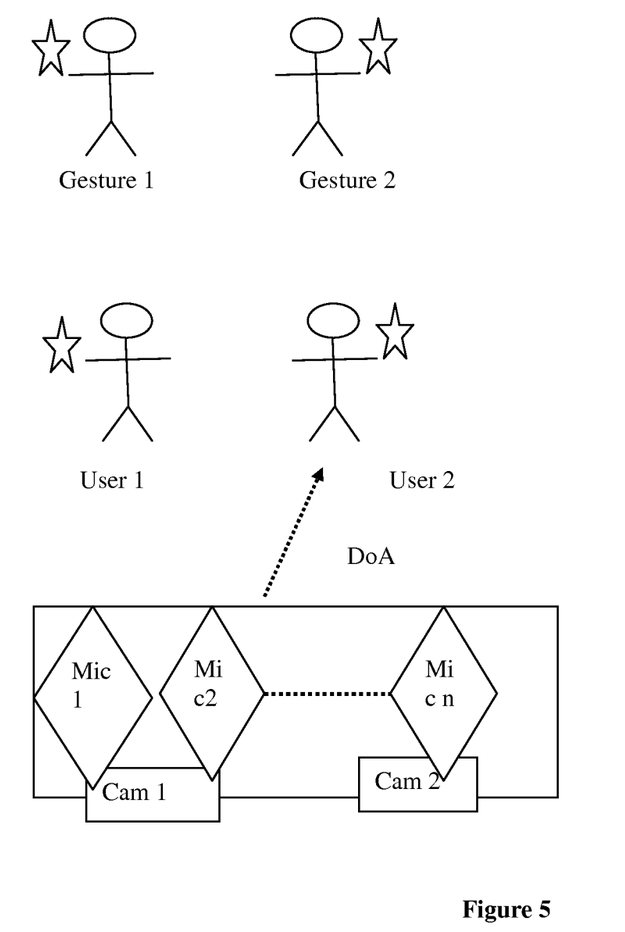
FIG. 5 illustrates a working example of the intuitive gesture creation according to the method illustrated in FIG. 3 of the present subject matter.

As illustrated in the FIG. 5, gesture 1 and gesture 2 explain how the same audio gesture can be combined with the same visual gesture to mean a different gesture. Gesture 1 exhibits sound made by the right hand while the gesture 2 exhibits sound made by the left hand. Though the visual gesture in both the cases is the same, by detecting the direction of the sound and thus combining the gesture in the acoustic form and gesture in the visual form, two different gestures can be created. These two different gestures can be used to interpret two different actions made by the user.

Example 3

Application of the Sound and Visual Gesture

Figure 7:
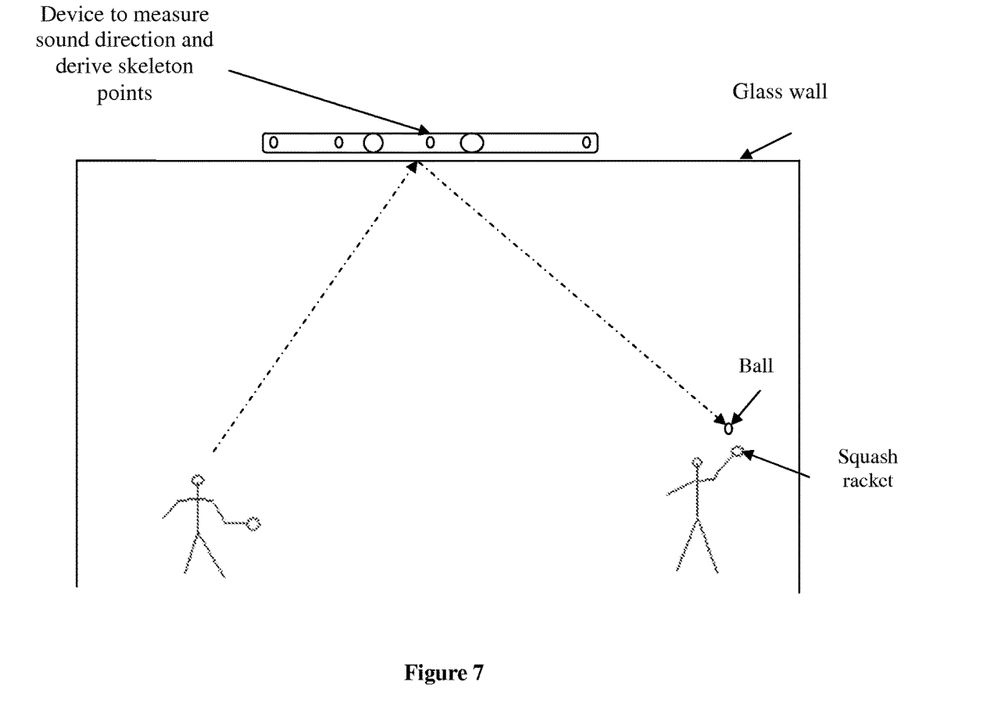
FIG. 7 illustrates a working example of the intuitive gesture creation according to the method illustrated in FIG. 3 of an embodiment of the present subject matter.

Referring to FIG. 7, in the multiplayer indoor game, the combination of 3D visual and 3D sound is used to determine an intuitive gesture, which is further processed to derive a meaning of the gesture. The combination of 3D visual and 3D sound is considered as a 2-tuple. Multiple such tuples over time are used to analyze the complete meaning of the sequence of tuples. Let us illustrate this statement with the indoor game, squash.

In the squash game, two players are involved where a tennis ball is hit alternately by each player using a squash racket. The arrangement is shown in the FIG. 7, where the sensing device is placed behind the glass wall in such a way that the players are not distracted. The sensing device continuously captures the skeleton points of both the players and also the sound direction.

The instances of sounds are as follows:
a. Ball hitting the glass wall
b. Ball hitting the side wall
c. Ball hitting the racket
d. Ball hitting the floor
e. Players' shoes hitting the floor
f. Other sounds.

The above sounds can be modeled using HMM and can be used to detect the type of sound during the game.

Thus the feature vector is given below:
F={skeleton points ($sk_i$) for all i and both the players, sound type and sound direction}

Based on the above features we can derive the following information:
a. exact time instances of different sounds
b. type of sound (contact point of the ball with certain object)
c. location of the skeleton points for both the players Given the above information we would be able to derive the following
a. The active player (hitting the ball) and the passive player
b. Predict the direction of the ball assuming the ball will traverse in straight line. Any deviation of the same can be derived from the actual contact information (sound location) and hence the swing of the ball be derived.
c. The change in the skeleton points over time between two sound instances. This will allow in analyzing on how the player reacts to the situation when the player is an active player and how the player takes the positions when in passive state.

Thus the fitness level and the skill of the player can be analyzed in real-time during the progress of the match.

ADVANTAGES OF THE INVENTION

1. The combination of gesture in acoustic form with the gesture in visual form creates a new gesture set thus enhancing the already existing library of the gesture set.
2. The detection direction of the sound source helps in accurately identifying the user in control of the device.
3. The difficulty in tracking the skeleton points of human postures when they come close to each other is overcome by combining the directionality of the gesture in the acoustic form with the gesture in the visual form.
4. The gesture set including the combination of visual and sound gesture aids the classifier in classifying amongst the gestures when the number of gestures increases.

We claim:
1. A device for generating one or more sets of intuitive gestures, the device comprising:
a gesture creator inducting:
one or more sensors adapted for obtaining scalar data and vector data from at least one user wherein the one or more sensors include one or more microphone and one or more camera; and wherein the scalar data includes at least one of a visual data or acoustic data and the vector data includes at least one of a direction of the acoustic data or X, Y, Z cloud points of the visual data;
a fusing system adapted for fusing the vector and the scalar data by Bayesian rules to generate one or more sets of intuitive gestures; and
a tangible media adapted for storing the generated sets of intuitive gestures to create a gesture library that is used by a reciprocating module;
wherein the reciprocating module maps, using the gesture library, a set of gestures similar to the generated sets of intuitive gestures.

2. The device as claimed in claim 1, wherein the reciprocating module maps the set of gestures similar to the generated sets of intuitive gestures based on an interpretation of a set of gestures for at least one of playing a game, controlling a vehicle, or operating an electronic device.

3. The device as claimed in claim 1, wherein the visual data includes relative motion between skeleton points.

4. The device as claimed in claim 1, wherein the tangible media includes at least one of a storage device or a hard disk.

5. A computer implemented method for generating one or more sets of intuitive gestures, the method performed by at least one processor and comprising:
obtaining scalar data and vector data from at least one user wherein the scalar data includes at least one of a visual data or acoustic data and the vector data includes at least one of a direction of the acoustic data or X, Y, Z cloud points of the visual data;

fusing the scalar data and the vector data by Bayesian rules to generate one or more sets of intuitive gestures;

storing the generated sets of intuitive gestures to create a gesture library; and mapping, using the stored sets of intuitive gestures, a set of gestures similar to the generated sets of intuitive gestures.

6. The computer implemented method as claimed in claim 5, wherein mapping the set of gestures similar to the generated sets of intuitive gestures includes mapping the set of gestures based on an interpretation of a set of gestures for at least one of playing a game, controlling a vehicle, or operating an electronic device.

7. The computer implemented method as claimed in claim 5, wherein the visual data includes a relative motion between skeleton points of the user.

8. A non-transitory computer-readable medium storing instructions, which when executed by at least one processor, cause the at least one processor to perform a method comprising for generating one or more sets of intuitive gestures, the method performed comprising:

obtaining scalar data and vector data from at least one user wherein the scalar data includes at least one of a visual data or acoustic data and the vector data includes at least one of a direction of the acoustic data or X,Y,Z cloud points of the visual data;

fusing the scalar data and the vector data by Bayesian rules to generate one or more sets of intuitive gestures;

storing the generated sets of intuitive gestures to create a gesture library; and mapping, using the stored sets of intuitive gestures, a set of gestures similar to the generated sets of intuitive gestures.

9. The medium as claimed in claim 8, wherein mapping the set of gestures similar to the generated sets of intuitive gestures includes mapping the set of gestures based on an interpretation of a set of gestures for at least one of playing a game, controlling a vehicle, or operating an electronic device.

10. The medium as claimed in claim 8, wherein the visual data includes a relative motion between skeleton points of the user.

11. The medium as claimed in claim 8, wherein the medium includes at least one of a storage device or a hard disk.

* * * * *